(12) United States Patent
Troxler

(10) Patent No.: US 7,922,159 B2
(45) Date of Patent: Apr. 12, 2011

(54) CLAMPING APPARATUS FOR POSITIONING AND FIXING WORK PIECES

(75) Inventor: Ferdinand Troxler, Schenkon (CH)

(73) Assignee: F-Tool International AG (CH)

( * ) Notice: Subject to any disclaimer, the term of this patent is extended or adjusted under 35 U.S.C. 154(b) by 314 days.

(21) Appl. No.: 11/684,758

(22) Filed: Mar. 12, 2007

(65) Prior Publication Data

US 2007/0210500 A1    Sep. 13, 2007

(30) Foreign Application Priority Data

Mar. 13, 2006 (CH) .................................. 393/06

(51) Int. Cl.
   *B25B 1/22* (2006.01)
   *B23Q 3/00* (2006.01)
   *B25B 1/00* (2006.01)
   *B23Q 1/25* (2006.01)

(52) U.S. Cl. ............ 269/71; 269/16; 269/20; 269/155

(58) Field of Classification Search .............. 269/71, 269/16, 20, 22, 35, 88, 91, 155
See application file for complete search history.

(56) References Cited

U.S. PATENT DOCUMENTS

| | | | | | |
|---|---|---|---|---|---|
| 2,176,089 | A | * | 10/1939 | Malone | 269/287 |
| 2,995,962 | A | * | 8/1961 | Dietz | 269/71 |
| 3,349,927 | A | * | 10/1967 | Blatt | 414/627 |
| 3,693,965 | A | * | 9/1972 | Mitsengendler | 269/20 |
| 3,712,606 | A | * | 1/1973 | Cole | 269/92 |
| 4,280,054 | A | * | 7/1981 | Guarino | 250/440.11 |
| 4,566,169 | A | * | 1/1986 | Vesely | 29/560 |
| 4,571,864 | A | * | 2/1986 | Bopp | 38/102.5 |
| 4,735,671 | A | * | 4/1988 | Stoffel et al. | 156/304.3 |
| 4,936,497 | A | * | 6/1990 | Ordelt | 227/5 |
| 5,019,129 | A | * | 5/1991 | Johanson | 269/71 |
| 5,026,033 | A | * | 6/1991 | Roxy | 269/45 |
| 5,056,766 | A | * | 10/1991 | Engibarov | 269/136 |
| 5,228,666 | A | * | 7/1993 | Drake et al. | 269/21 |
| 5,284,331 | A | * | 2/1994 | Lee et al. | 269/16 |
| 5,487,538 | A | * | 1/1996 | Tibbet | 269/71 |
| 5,595,377 | A | * | 1/1997 | Tibbet | 269/71 |
| 5,630,577 | A | * | 5/1997 | Tankersley | 269/309 |
| 5,667,208 | A | * | 9/1997 | Schroer et al. | 269/21 |
| 5,718,420 | A | * | 2/1998 | Bernstein | 269/138 |
| 5,921,533 | A | * | 7/1999 | Miyamoto et al. | 269/71 |

(Continued)

*Primary Examiner* — Lee D Wilson
*Assistant Examiner* — Alvin J Grant
(74) *Attorney, Agent, or Firm* — Maginot, Moore & Beck, LLP

(57) ABSTRACT

A clamping apparatus for attaching work pieces to be machined to the work table of a machine tool in a precisely defined position comprises at least one clamping rail to be attached to the work table of the machine, as well as at least one work piece holder. The clamping rail is provided with an elongate protruding portion, the front face thereof constituting a stop surface and which defines a recess between itself and the work table of the machine tool. The elongate protruding portion may be provided with threaded bores for receiving clamping screws. Each work piece holder includes a clamping portion which can be inserted into the recess and clamped therein by means of the clamping screws. The clamping rail includes a flat bottom surface resting on the surface of the work table of the machine tool and running perpendicular to the aforementioned front face of the elongate protruding portion. The side of the work piece holder having the aforementioned clamping portion includes a reference surface adapted to rest against the front face of the elongate portion of the clamping rail.

9 Claims, 4 Drawing Sheets

U.S. PATENT DOCUMENTS

| | | | | |
|---|---|---|---|---|
| 5,970,603 | A * | 10/1999 | Quintana et al. | 29/603.12 |
| 5,984,291 | A * | 11/1999 | Iwata et al. | 269/73 |
| 5,984,292 | A * | 11/1999 | Troha | 269/91 |
| 6,126,158 | A * | 10/2000 | Engibarov | 269/136 |
| 6,150,787 | A * | 11/2000 | Lee | 318/649 |
| 6,174,102 | B1 * | 1/2001 | Do et al. | 403/381 |
| 6,196,596 | B1 * | 3/2001 | Kwok et al. | 285/123.1 |
| 6,252,370 | B1 * | 6/2001 | Ebihara et al. | 318/649 |
| 6,264,186 | B1 * | 7/2001 | Hill | 269/47 |
| 6,292,998 | B1 * | 9/2001 | Wiemers | 29/559 |
| 6,332,604 | B1 * | 12/2001 | Chu | 269/71 |
| 6,355,906 | B1 * | 3/2002 | Okuno et al. | 219/121.63 |
| 6,439,561 | B1 * | 8/2002 | Ausilio | 269/47 |
| 6,523,818 | B1 * | 2/2003 | Le Vert et al. | 269/96 |
| 6,637,737 | B1 * | 10/2003 | Beecherl et al. | 269/71 |
| 6,651,969 | B2 * | 11/2003 | Chiba | 269/73 |
| 6,681,464 | B1 * | 1/2004 | Dupuis et al. | 29/281.1 |
| 6,693,402 | B2 * | 2/2004 | Ebihara et al. | 318/649 |
| 6,698,738 | B2 * | 3/2004 | Wiebe | 269/75 |
| 6,708,858 | B2 * | 3/2004 | Oetlinger | 225/104 |
| 6,755,408 | B2 * | 6/2004 | Walter | 269/136 |
| 7,068,891 | B1 * | 6/2006 | Cook et al. | 385/52 |

* cited by examiner

CLAMPING APPARATUS FOR POSITIONING AND FIXING WORK PIECES

BACKGROUND

The present invention relates to a clamping apparatus for positioning and fixing work pieces to be machined on a work table of a machine tool. The invention may be particularly useful for a wire erosion machining apparatus. In particular, the invention concerns a clamping apparatus comprising at least one clamping rail member adapted to be attached to the work table of the machine tool, and at least one work piece holder adapted to be clamped to the clamping rail member in a well defined position.

If a tool or a work piece to be machined has to be clamped to a work table of a machine tool, usually, in a first step, the tool and the work piece, respectively, are fixed to a pallet and, in a second step, the pallet is clamped to a chuck member. The chuck member itself is, in most cases, rigidly attached to the machine tool. The actuation of the clamping elements of the chuck member is usually performed manually, electro-mechanically, pneumatically or hydraulically.

The document EP-B-0 202 452 discloses a fixing and reference system for a wire spark erosion machine. This fixing and reference system comprises reference elements in the form of flat, plate-like strips made of hardened steel, adapted to be attached to the work table of the wire spark erosion machine. The cross section of these reference elements is essentially dovetailed, whereby the top surface has a larger width than the bottom surface. The reference element comprises a side surface adjoining the top surface, extending in a right angle both to the top and bottom surfaces and constituting the Y-direction reference. Moreover, the reference element comprises several continuous bores adapted to receive bolts, by means of which the reference element can be fixed to threaded bores provided in the work table of the machine tool. The X-direction reference is constituted by a block-like portion fixed to the front surface of the reference element and having a stop surface. A work piece to be clamped on the work table is positioned against the side surface adjoining the top surface of the reference element and clamped by means of clamping members. Such a fixing and reference system probably is useful for lighter work pieces. Moreover, the fabrication of the reference elements is laborious and expensive.

The document U.S. Pat. No. 5,019,129 discloses a holding system for a work piece having a clamping frame provided with a fixed and a movable clamping jaw. A fixture provided on the machine tool comprises a dovetailed protrusion to which is attached a fixture plate having a corresponding recess. The fixture plate is adjustable and can be held in position by a clamping mechanism. An adapter is attached to the fixture plate, provided with a dovetail as well and to which a clamping frame can be attached. The clamping mechanism for holding the fixture plate in position comprises spring-biased pins as well as a locking screw.

The document EP-A-1 402 985 discloses a clamping apparatus comprising a frame member and attached to the work table of a machine tool. The frame member is provided with two lateral legs and with a distance member inserted therein between. Moreover, the frame member comprises two guide elements running between the two lateral legs. A lockable slide member is movably guided by the two guide elements. The slide member is adapted to receive and clamp work pieces.

SUMMARY OF THE INVENTION

It is an object of the invention to improve a clamping apparatus for positioning and fixing work pieces to be machined on a work table of a machine tool, particularly a wire erosion machining apparatus, such that it is of simple design and can be manufactured at low costs, that it is rigid and particularly adapted to clamp work pieces of different shapes, and that the work pieces can be clamped and released, respectively, quickly and easily.

To this end, the present invention provides a clamping apparatus for positioning work pieces to be machined on a work table of a machine tool, particularly a wire erosion machining apparatus. The clamping apparatus comprises at least one clamping rail member adapted to be attached to the work table of the machine tool, and at least one work piece holder adapted to be clamped to the clamping rail member in a well defined position. The clamping rail member is provided with an elongate protruding portion, delimiting between its bottom side and the surface of the work table an elongate recess and comprises a clamping element extending into that elongate recess. Each of the work piece holders comprises at least one protruding clamping portion adapted to be inserted into the elongate recess and to be clampingly fixed by means of the clamping element.

DESCRIPTION OF THE FIGURES

In the following, an embodiment of the clamping apparatus according to the invention will be further described, with reference to the accompanying drawings, in which.

DESCRIPTION OF THE EMBODIMENTS

Figure 1:
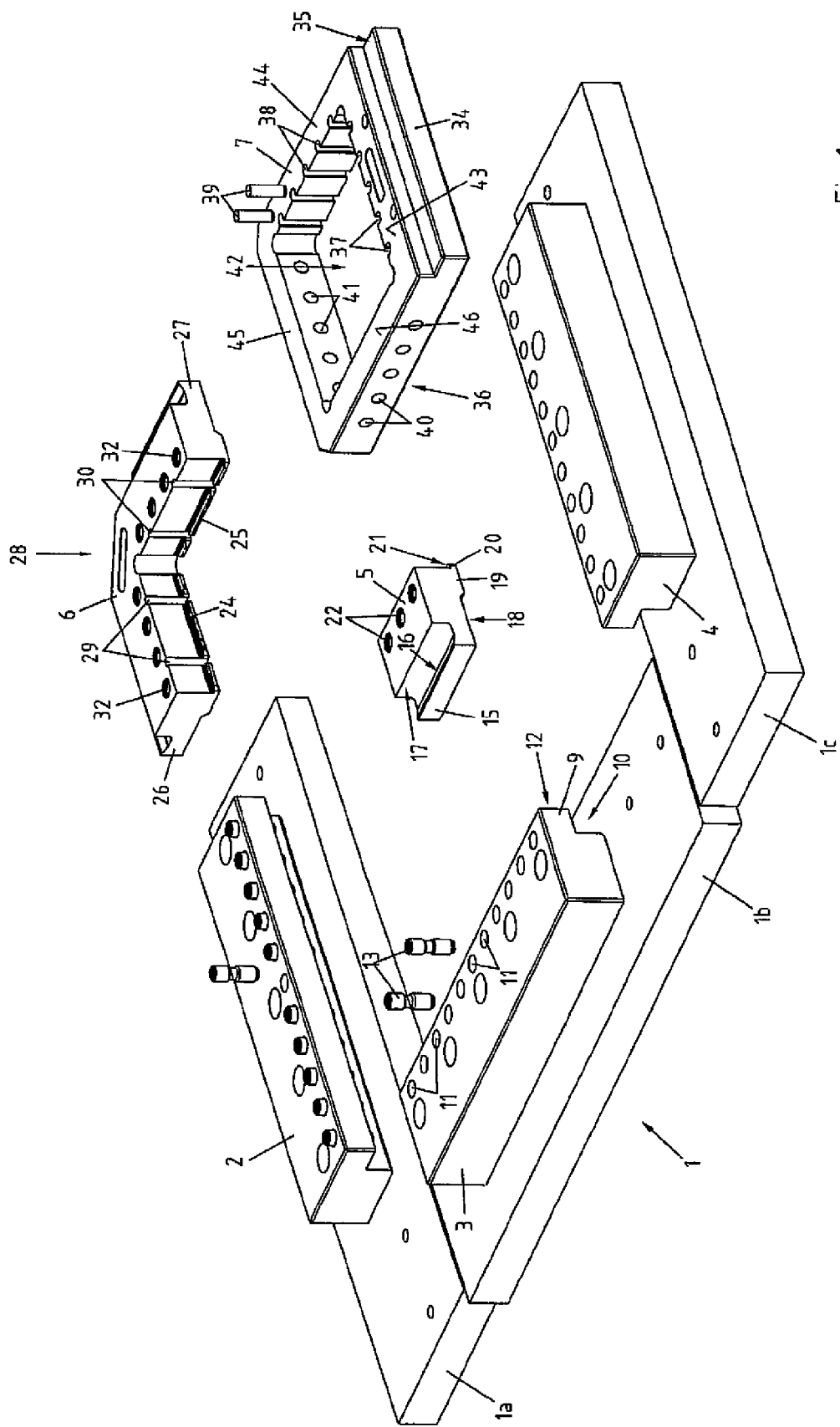
FIG. 1 shows a perspective view of the clamping apparatus.

FIG. 1 shows a perspective overview of a clamping apparatus according to one embodiment of the invention. Particularly, the clamping apparatus is adapted to hold work pieces in a well defined position on a work table 1 of a machine tool (not shown). In certain embodiments, the machine tool may be a wire erosion machining apparatus. In the present example, the work table 1 of the machine tool is constituted by three slab members 1a, 1b and 1c, each having a rectangular shape and each being arranged in a U-shaped pattern. Between these slab members 1a, 1b, 1c, a working or machining area is constituted within which the machining tools of the machining apparatus can freely move in X-, Y-and Z-directions. It is understood that the work table 1 shown in FIG. 1 is only one of many examples and that various other arrangements would be possible.

In the present example, the clamping apparatus comprises three clamping rails 2, 3 and 4, all three clamping rails being of substantially identical design, as well as three differently configured work piece holders 5, 6 and 7. It is understood that the clamping apparatus comprises, within the scope of the present invention, at least one of the clamping rails 2, 3 and 4, and at least one of the work piece holders 5, 6 and 7. Each of the clamping rails 2, 3 and 4 has a bottom surface facing the work table 1, being flat and constituting a Z-reference surface. Each of the three clamping rails 2, 3 and 4 is rigidly connected to one of the three slab members 1a, 1b, 1c of the work table 1 by means of fasteners, e.g. screws, not shown in the drawings.

The general design of a clamping rail shall be further explained, in the following, by describing the central clamping rail 3 in more detail. It is understood that the two other clamping rails 2 and 4 are designed accordingly. Particularly, the front side of the clamping rail 3, i.e. the side facing the working area mentioned herein above, is provided with an elongated protruding portion 9. The protruding portion 9 defines a recess 10 between itself and the work table 1, particularly the assigned slab member 1b. The recess 10 has a generally rectangular cross section. Thus, the clamping rail 3 has essentially an L-shaped cross section. The protruding portion 9 is provided with a plurality of threaded bores 11, adapted to receive clamping elements in the form of screws 13. As an example, two of these screws 13 are shown in FIG. 1. The front face 12 of the elongate protruding portion 9 is flat and constitutes a rest surface for the assigned work piece holder 5, 6, 7, as will be explained in more detail herein after. The bottom side of the clamping rail 3 is flat as well and rests on the top surface of the assigned slab member 1b of the work table 1 upon rigidly connecting the clamping rail 3 to the work table 1 and the slab member 1b, respectively.

In order to be able to set the position of a work piece holder 5, 6, 7 with regard to a clamping rail 2, 3, 4, i.e. in X-or Y-direction, reference pins are provided that can be inserted into a threaded bore 11 in the assigned clamping rail 3, thus constituting a lateral stop member for the particular work piece holder 5, 6, 7. Instead of reference pins, stop members can be provided, positionally fixed to the particular by means of the screws 13. Stop members are particularly advantageous if a work piece has to be positioned only with reference to one of the clamping rails, and/or if very small work piece have to be clamped by only one clamping rail. Also, if identical work piece units (i.e. work piece holders together with a work piece) have to be positioned with regard to a clamping rail, stop members may prove advantageous. Finally, it should be mentioned that no stop members at all are required if a work piece has to be fixed to two clamping rails being offset to each other by 90°.

The first work piece holder 5 is provided with a protruding clamping portion 15, serving for clamping the work piece holder 5 to the clamping rail 3. At the side where the clamping portion 15 is situated, the work piece holder 5 is provided with a reference surface 17. The top of the protruding clamping portion 15 is provided with an inclined clamping surface 16, adapted to be engaged by the clamping screws 13 of the clamping rail 3 in such a way that the work piece holder 5 is pulled into the recess 10 upon clamping the work piece holder 5 to the clamping rail 3. Consequently, the reference surface 17 of the work piece holder 5 abuts against the front surface 12 of the clamping rail 3 and is, thereby, positioned in X-or Y-direction. The bottom side 18 of the work piece holder 5 is provided with a flat Z-reference surface, resting on the surface of the work table 1 upon clamping the work piece holder 5 to the clamping rail 3; thus, the work piece holder is positioned in the Z-direction. The side of the work piece holder 5 that is opposite to the clamping portion 15 is provided with a shoulder 19 protruding downwards from the flat bottom side 18, having at its end a protruding portion 20 whose top side serves as a rest surface 21. This rest surface 21 extends in the same plane as the flat bottom surface 18 of the work piece holder 5 and serves for supporting a work piece in the Z-direction. Once the work piece holder 5 is clamped to the clamping rail 3, the rest surface 21 of the protruding portion 20 extends in the plane of the surface of the work table 1 and, thereby, in the Z-plane defined by the machine tool.

Moreover, the work piece holder 5 comprises several threaded bores 22, adapted to receive clamping members by means of which a work piece can be fixed to the work piece holder 5, as will be further explained in more detail herein after. The work piece holder 5 may be used primarily as Z-rest member for larger work pieces, whereby such larger work pieces are fixed preferably to at least two work piece holders.

It is understood that work piece holders can be used that have a flat bottom side, whereby the aforementioned downwardly protruding shoulder 19 is omitted, such that the front end thereof does not reach below the surface of the machine work table, i.e. the Z-reference. This is of particular importance if the clamping apparatus of the invention is used in a machine tool having a continuous flat work table, not having a working area reaching below the surface of the work table of the machine tool. Instead of using work piece holders having a continuous flat bottom side, some sort of spacer element can be used, the thickness thereof corresponding at least to the Z-distance of the downwardly protruding shoulder 19 of the work piece holder 5. In practice, such a spacer element would be inserted below the work piece holder 5 with the result that the downwardly protruding shoulder 19 no longer reaches below the surface of the work table 1 of the machine tool in Z-direction.

The second work piece holder 6 is designed in the shape of a 90° angle; the front sides of the two legs are provided, in a corresponding manner, each with a protruding portion 24, 25 offset to each other by 90°, the top sides thereof constituting the Z-axis rest surfaces for a work piece. The work piece holder 6 also comprises several threaded bores 32 adapted to receive screws for attaching clamping members. Along the two inner surfaces, the work piece holder is provided, in each case, with two grooves 29, 30 extending along the full height of the work piece holder 6 and subdividing the protruding portions 24, 25 into separate sections. These grooves enable an erosion wire to be run between a work piece attached to the work piece holder 6 and the work piece holder 6 itself, as will be explained in more detail with reference to FIG. 2 herein after.

The rear side of the work piece holder 6 is provided with two clamping portions 26, 27, offset to each other by 90°, by means of which the work piece holder can be attached to a clamping rail. A further clamping portion 28 is located between the two clamping portions 26, 27 and offset by 45° to each of the two clamping portions 26, 27. The result is that the work piece holder 6 can be attached to a clamping rail in three different positions. Such a work piece holder 6 is particularly suitable for holding rectangular as well as also round work pieces. Moreover, large work pieces can be clamped by means of two work piece holders 6. Also, if required, work pieces can be clamped in a position offset by 180° relative to the initial position for machining.

The third work piece holder 7 is designed in the shape of a rectangular clamping frame. The work piece holder 7 has four frame sides 43, 44, 45, 46, delimiting a central aperture 42 for receiving a work piece to be clamped and machined. One of the frame sides, i.e. the frame side 43, is provided with a clamping portion 34; however, it is understood that, instead of one single clamping portion, two or three of them could be provided. The top side of the clamping portion 34 is provided with a flat clamping surface running parallel to the bottom side 36 of the work piece holder 7. The bottom side of the work piece holder 7 is continuously flat. The inner sides of two frame sides 43, 44 of the work piece holder 7 are provided with bores 37, 38, adapted to receive stop pin members 39. A stop pin member 39 inserted into a bore 37, 38 slightly protrudes from the inner side of the inner wall of the particular frame side 43, 44 and, thereby, forms a stop member for a work piece to be clamped in a work piece holder 7. By providing such stop pin members 39, the work piece holder can be manufactured without involving high costs. For example, as a base material for a work piece holder 7, an ordinary steel, not a hardened and tempered or annealed steel, can be used. Moreover, the inner sides of the frame shaped work piece holder 7 do not have to be machined with high precision, since the reference surfaces in the X-and Y-directions are established by the stop pin members 39. It is understood that the bores 37, 38 can be also used to run an erosion wire through them if a work piece is attached to the work piece holder 7.

The other two sides 45, 46 of the frame are provided with horizontally extending threaded bores 40, 41, adapted to receive clamping screws (not shown) to clamp a work piece in the aperture 42.

In contrast to the two work piece holders 5 and 6 described herein before, the frame shaped work piece holder 7 is not provided with clamping portions whose top surfaces constitute a Z-reference for a work piece to be clamped in the work piece holder. In order to reliably set the Z-position of a work piece to be clamped in a work piece holder 7 within its aperture 42, the work piece holder 7 can be positioned on top of a flat plate member, for example a precisely flat ground granite plate. Thereafter, the work piece to be received in the work piece holder 7 is put into its aperture 42 to be clamped to the work piece holder by means of screws inserted into the threaded bores 40, 41.

Figure 2:
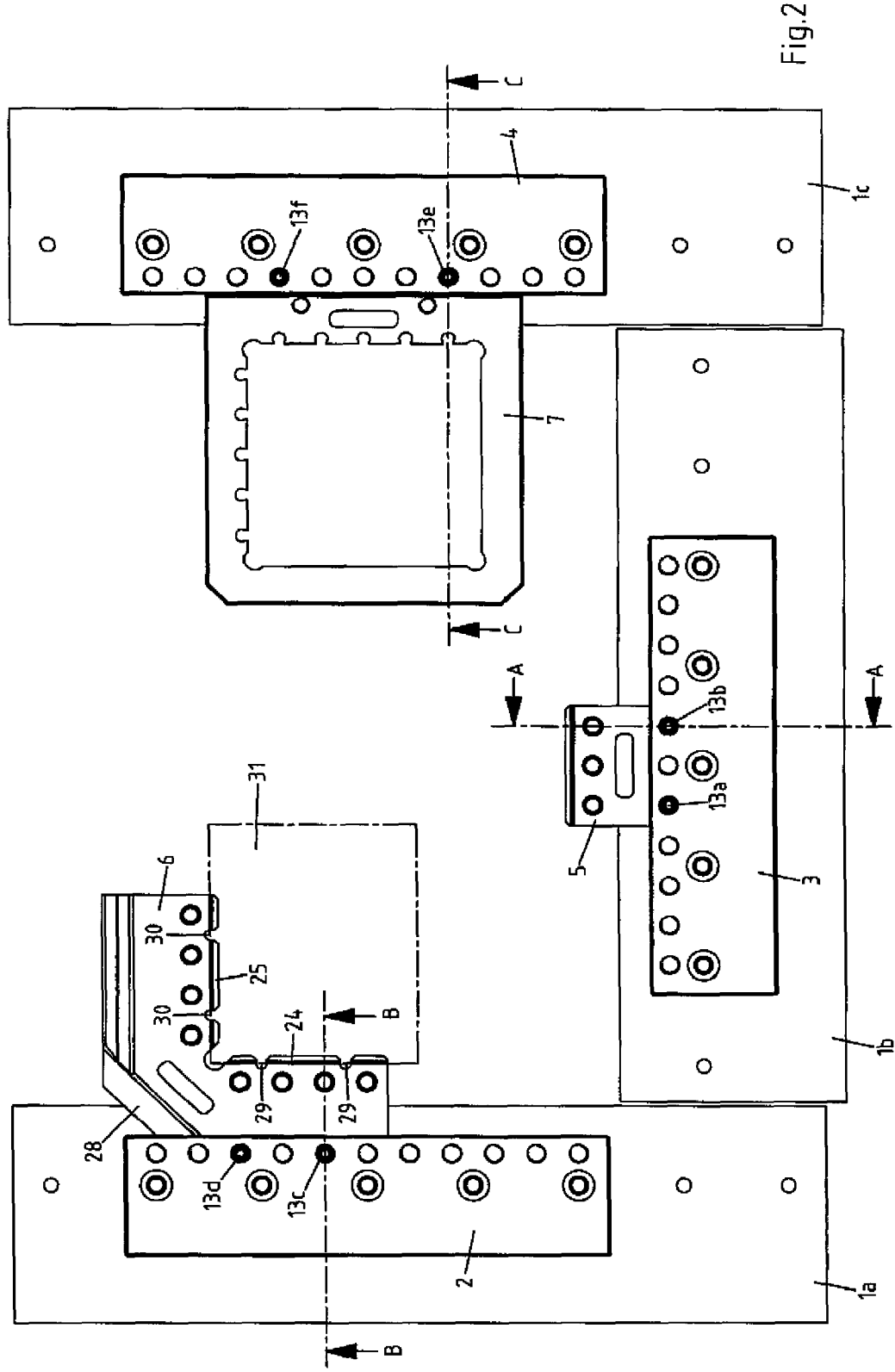
FIG. 2 shows a top view of the clamping apparatus.

FIG. 2 shows the clamping apparatus of the invention in a view from the top, whereby each work piece holder 5, 6, 7 is clamped to a clamping rail 2, 3, 4. Particularly, the first work piece holder 5 is clamped to the central clamping rail 3, while the second work piece holder 6, having an angled shape, is clamped to the left side clamping rail 2 and the third work piece holder 7, having the shape of a clamping frame, is clamped to the right side clamping rail 4. Each of the work piece holders 5, 6, 7 is clamped to the assigned clamping rail 2, 3, 4 by means of clamping screws 13a, 13b; 13c, 13d; 13e, 13f.

In this view, it can be clearly seen that the work piece holder 6, having angled shape, is provided with the aforementioned third clamping portion 28, extending between the two clamping portions 26, 27 (FIG. 1) that include an angle of 90°. Moreover, a schematically illustrated work piece 31 is shown, which is attached to the angled work piece holder 6. By providing the aforementioned slots 29, 30, located at the inner side walls of the legs of the angled work piece holder 6 and preferably machined into their surfaces, the insertion of an erosion wire between the work piece 31 clamped to the work piece holder 6 and the legs of the work piece holder 6 is easily possible. Thus, a work piece 31 clamped to the work piece holder 6 can be machined by wire erosion also from the back sides thereof, or the exact position of the work piece 31 can be easily determined automatically by approaching the erosion wire from all four sides until it touches the work piece 31.

Figure 3:
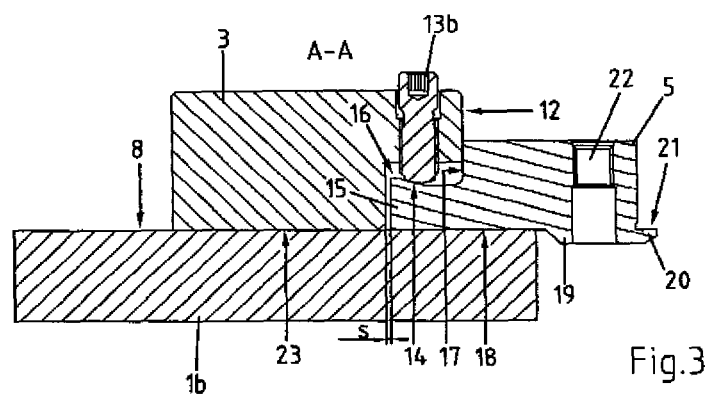
FIG. 3 shows a cross sectional view of the clamping apparatus, taken along the line A-A in FIG. 2.

FIG. 3 shows a cross sectional view of the clamping apparatus according to the invention along the line A-A in FIG. 2. As can be seen in this illustration, the clamping screw 13b exerts a pressure force on the clamping portion 15 of the first work piece holder 5 and thereby rigidly attaches the latter one to the clamping rail 3. The clamping screw 13b has a convex front end face engaging the inclined top surface 16 of the clamping portion 15 of the work piece holder 5 in such a way that the work piece holder 5, on the one hand, is pressed with its flat bottom surface downwards against the slab member 1b and, on the other hand, is pressed with its rear reference surface against the flat front face 12 of the clamping rail 3. Furthermore, it can be seen in this illustration that the rest surface 21 of the protruding portion 20, adapted to support a work piece, is at the same height level as the top surface 8 of the slab member 1b of the work table 1. The result is that a work piece, resting on the surface 21 of the protruding portion 20 of the work piece holder 5, is exactly aligned with reference to the surface 8 of the slab member 1b of the work table 1. As can be seen in FIG. 3, the bottom side 23 of the clamping rail 3, constituting the Z-direction rest surface, runs perpendicular to the front surface 12 thereof, constituting a stop surface. In order to ensure that the rear reference surface 17 of the work piece holder 5 reliably rests on the flat front surface 12 of the clamping rail 3, the clamping portion 15 is somewhat shorter in horizontal direction than the depth of the recess 10 (FIG. 1) of the claming rail 3. Once the work piece holder 5 is clamped to the clamping rail 3, a gap S exists between the front surface of the clamping portion 15 of the work piece holder 5 and the rear wall of the recess 10. This gap S simultaneously constitutes an area in which dirt particles can be received without any negative impact to the clamping accuracy of a work piece holder to be clamped to a clamping rail. Moreover, the surface responsible for an accurate positioning of a work piece holder, namely the flat front surface 12 of the clamping rail 3, is easy to clean.

Figure 4:
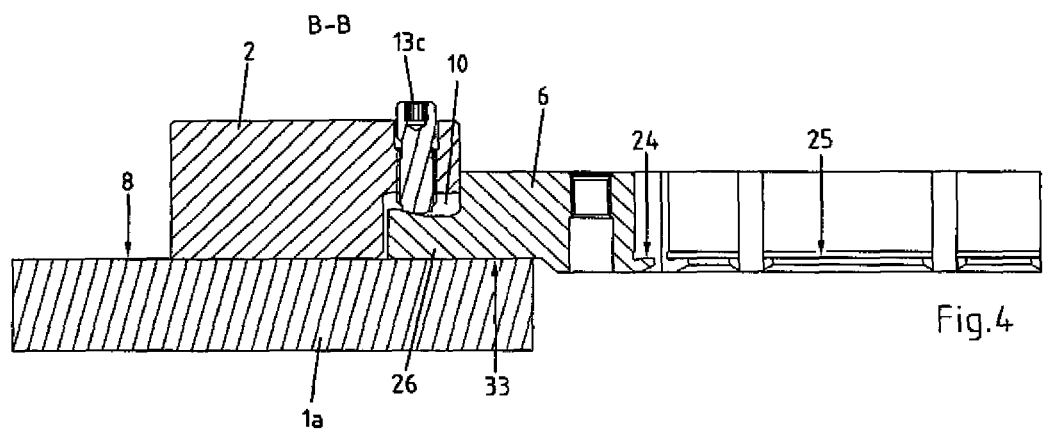
FIG. 4 shows a cross sectional view of the clamping apparatus, taken along the line B-B in FIG. 2.

FIG. 4 shows a cross sectional view of the clamping apparatus according to the invention along the line B-B in FIG. 2. In this case as well, the clamping screw 13c with its convex front end face exerts a pressure force on the clamping portion 26 of the second work piece holder 6 in such a way that the work piece holder 6, on the one hand, is pressed with its flat bottom surface 33, constituting the Z-direction rest surface, downwards against the surface 8 of the slab member 1a and, on the other hand, is pressed with its rear reference surface against the flat front face of the clamping rail 2. Again, the rest surfaces of the protruding portions 24, 25 are at the same height level as the surface 8 of the slab member 1a of the work table 1.

Once the clamping portion 26 has been inserted into the recess 10 of the clamping rail 2, the work piece holder 6 is held in position by means of the clamping rail 2 even if the clamping screw 13c is not yet fully tightened. The fundamental advantage thereof is that the work piece holder 6 can be released after having been coarsely positioned with regard to the clamping rail 2, without the danger that it could fall out of the recess 10.

Figure 5:
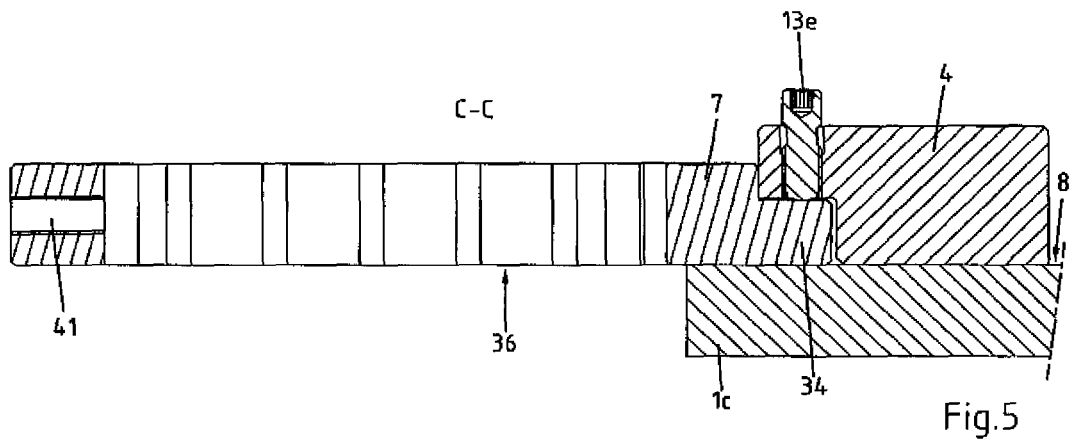
FIG. 5 shows a cross sectional view of the clamping apparatus, taken along the line C-C in FIG. 2.

FIG. 5 shows a cross sectional view of the clamping apparatus according to the invention along the line C-C in FIG. 2. In this case, the work piece holder 7 having the shape of a clamping frame is pressed only perpendicularly against the surface 8 of the slab member 1c by means of the clamping screw 13e, since the top surface of the clamping portion 34 of the work piece holder 7 is flat and extends parallel to the bottom surface 36 of the work piece holder 7. Upon clamping, the work piece holder 7 is manually pressed against the clamping rail 4. Once the work piece holder 7 has been clamped, its flat bottom surface 36 is at the same height level as the surface 8 of the slab member 1c. In this illustration, moreover, one of the horizontally extending threaded bores 41 is visible, adapted to receive a clamping screw (not shown) for clampingly attach a work piece to the work piece holder 7.

Figure 6:
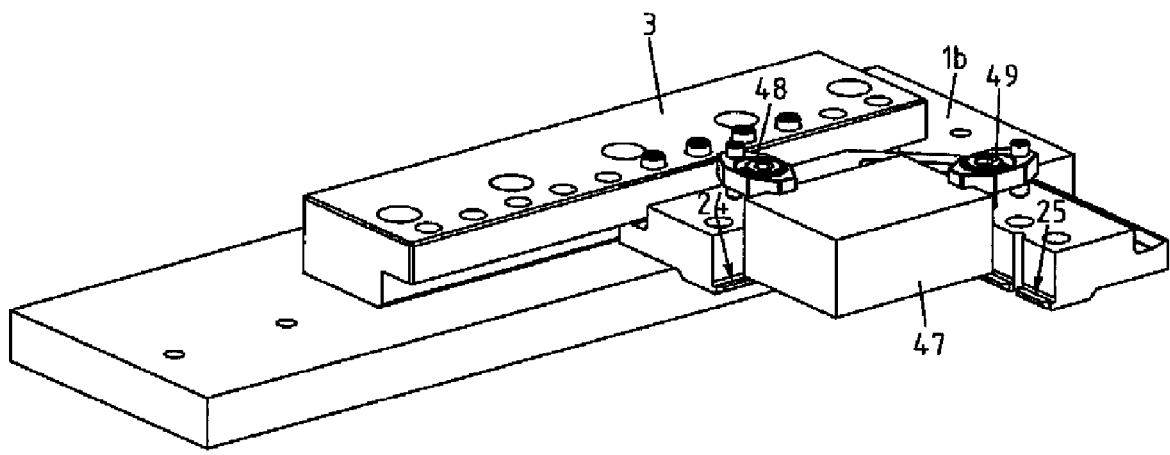
FIG. 6 shows a perspective view of a work piece clamped in the clamping apparatus.

FIG. 6 shows a perspective view a work piece holder 6 clamped to a clamping rail 3, together with a work piece 47 attached to the work piece holder 6. In order to exactly position the work piece holder 6 with regard to the clamping rail 3, a stop member may be provided (not shown in FIG. 6). The work piece 47, having, for example, the shape of a cuboid, is clamped to the angled work piece holder 6 by means of two clamping members 48, 49. The work piece 47 is positioned with regard to the two side walls of the work piece holder 6 as well as with regard to the two protruding portions 24, 25, thereby having a predefined X-, Y- and Z-position. The work piece 47 clamped to the work piece holder 6 is freely accessible to a large extent so that it can easily be machined by means of a machine tool, for example a wire erosion machine.

The clamping apparatus according to the invention is of modular design: On the one hand, one or several clamping rails can be used, and on the other hand, differently designed work piece holders can be assigned to different kinds of work pieces to be clamped. By providing differently designed work piece holders, in practice, each and every arbitrary work piece can be accurately and quickly clamped using one or more clamping rails. Instead of the work piece holders described herein before, it is possible, within the scope of the present invention, to provide other work piece holders having a different design than the ones shown in the drawings and explained herein before. For example, work piece holders in the form of so called tilting heads or floating tool holders can be used.

A further advantage may be seen in the fact that the clamping apparatus is not susceptible to contamination, and that it is very rigid so that big and relatively heavy work pieces can be clamped with a clamping apparatus of the invention. By providing work piece holders 5, 6, 7 whose clamping portions 15, 26, 27, 34 are matched to the assigned recesses 10 of the clamping rails 2, 3, 4, the clamping apparatus of the invention shows a further advantage, particularly in connection with big and heavy work pieces. In particular, the larger work piece, together with the work piece holder attached thereto, can be brought into approximate position manually by an operator using both hands and then released. Subsequently, each of the work piece holders 5, 6, 7 is then held by clamping portion 15, 26, 27, 34 inserted into the recesses 10 of the clamping rails 2, 3, 4, even if the work piece holder 5, 6, 7 slightly tilts downwards. Finally, the work piece holders 5, 6, 7 can be clamped to the assigned clamping rails by tightening the particular clamping screws. A similar situation can be observed during releasing the work piece once it has been machined. Compared to clamping apparatuses of the prior art this is a distinct advantage, since in these known apparatuses the work piece holder has to be supported by one hand, while the clamping elements are simultaneously tightened and released, respectively, by the other hand.

The invention claimed is:

1. A clamping apparatus for positioning work pieces to be machined on a work table of a machine tool, comprising at least one clamping rail member adapted to be attached to said work table of said machine tool, and at least one work piece holder adapted to be clamped to said clamping rail member in a precise position, characterized in that:

each of said at least one clamping rail member is provided with an elongate protruding portion, said protruding portion delimiting between a bottom side of said protruding portion and the surface of said work table an elongate recess and including a clamping element extending into said elongate recess wherein said protruding portion further includes a plurality of apertures substantially perpendicular to said bottom side with said clamping element being placed into any of the said plurality of apertures; and each of said at least one work piece holder includes at least one protruding clamping portion configured to insert into said elongate recess and to be clampingly fixed by said clamping element;

wherein said clamping element is configured to press upon a corresponding protruding clamping portion of said at least one work piece holder towards the work table;

at least one clamping rail member is provided with a flat bottom surface adapted to rest on said work table of said machine tool and defining a Z-direction reference, and said elongate protruding portion of said clamping rail member includes a front surface running perpendicular to said flat bottom surface;

at least one of said at least one work piece holder is provided with a reference surface located on a side of said holder on which said clamping portion is provided with said protruding portion extending from a portion of said side surface, said reference surface being adapted to rest against said front surface of said at least one clamping rail member; and said clamping portion of said at least one work piece holder is provided with an inclined clamping surface located at a top side thereof, said clamping element provided on said elongate protruding portion of said at least one clamping rail member engaging said inclined clamping surface such that said work piece holder is pulled towards said clamping rail member to rest with said reference surface against the front surface of the clamping rail member upon clamping said work piece holder in said clamping rail member.

2. A clamping apparatus according to claim 1, comprising at least two clamping rails as well as at least two differently configured work piece holders.

3. A clamping apparatus for positioning work pieces to be machined on a work table of a machine tool, comprising at least one clamping rail member adapted to be attached to said work table of said machine tool, and at least one work piece holder adapted to be clamped to said clamping rail member in a precise position, characterized in that:

each of said at least one clamping rail member is provided with an elongate protruding portion, said protruding portion delimiting between a bottom side of said protruding portion and the surface of said work table an elongate recess and including a clamping element extending into said elongate recess wherein said portion further includes a plurality of apertures substantially perpendicular to said bottom side with said clamping element being placed into any of the said plurality of apertures; and each of said at least one work piece holder includes at least one protruding clamping portion adapted to be inserted into said elongate recess and to be clampingly fixed by said clamping element;

wherein said clamping element is configured to press upon a corresponding protruding clamping portion of said at least one work piece holder towards the work table; and the work piece holder is configured as a clamping frame member, having at least one aperture adapted to receive a work piece, whereby at least one frame side of the work piece holder is provided with horizontally running threaded bores, adapted to receive clamping screws for clamping a work piece to said clamping frame member.

4. A clamping apparatus according to claim 3, characterized in that at least one frame side of the work piece holder is provided with vertically running bores located at the inner side of the frame facing said aperture and adapted to receive stop pin members.

5. A clamping apparatus according to claim 3, characterized in that the work piece holder is provided with a continuously flat bottom surface.

6. A clamping apparatus for positioning work pieces to be machined on a work table of a machine tool, comprising at least one clamping rail member adapted to be attached to said work table of said machine tool, and at least one work piece holder adapted to be clamped to said clamping rail member in a precise position, characterized in that each of said at least one clamping rail member is provided with an elongate protruding portion, said protruding portion delimiting between a bottom side of said protruding portion and the surface of said work table an elongate recess and including a clamping element extending into said elongate recess, and each of said at least one work piece holder includes at least one protruding clamping portion adapted to be inserted into said elongate recess and to be clampingly fixed by said clamping element, and further characterized in that the work piece holder is configured as an angled element having two legs and includes two protruding portions offset relative to each other by 90°, the top sides of said legs constituting rest surfaces for a work piece to be attached to said work piece holder.

7. A clamping apparatus according to claim 6, characterized in that said work piece holder configured as an angled element includes first and second clamping portions offset to each other by 90°.

8. A clamping apparatus according to claim 7, characterized in that said work piece holder configured as an angled element includes an additional clamping portion located between said first and second clamping portions that are offset to each other by 90°, said additional clamping portion extending in a direction that encloses an angle of 45° with the extension of said first and second clamping portions.

9. A clamping apparatus according to claim 7, characterized in that at least one of said two legs of said work piece holder is provided at the inner side with vertically running grooves, subdividing said clamping portions into separate sections.

* * * * *